(12) United States Patent
Bastian et al.

(10) Patent No.: US 8,680,385 B2
(45) Date of Patent: *Mar. 25, 2014

(54) SYSTEM AND METHOD FOR CONTROLLING A DIGITAL AUDIO SOURCE

(75) Inventors: Mark-Jan Bastian, Amstelveen (NL);
Tim Hemel, Tiel (NL)

(73) Assignee: N2IT Holding B.V., Schoonhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/493,787

(22) Filed: Jun. 11, 2012

(65) Prior Publication Data

US 2012/0253494 A1 Oct. 4, 2012

Related U.S. Application Data

(60) Continuation of application No. 12/507,242, filed on Jul. 22, 2009, now Pat. No. 8,198,524, which is a continuation of application No. 11/773,195, filed on Jul. 3, 2007, now abandoned, which is a continuation of application No. 11/355,851, filed on Feb. 15, 2006, now Pat. No. 7,238,874, which is a division of application No. 10/133,846, filed on Apr. 26, 2002, now Pat. No. 7,012,184, which is a continuation of application No. PCT/NL01/00055, filed on Jan. 26, 2001.

(30) Foreign Application Priority Data

Feb. 29, 2000 (NL) ...................................... 1014526

(51) Int. Cl.
*G05B 19/06* (2006.01)

(52) U.S. Cl.
USPC ........ 84/600; 84/601; 84/602; 369/9; 369/69; 369/70

(58) Field of Classification Search
USPC .................. 84/600–602; 369/9, 69, 70, 6, 709
See application file for complete search history.

(56) References Cited

U.S. PATENT DOCUMENTS

| | | |
|---|---|---|
| 3,755,792 A | 8/1973 | Harvey |
| 4,173,164 A | 11/1979 | Adachi et al. |

(Continued)

FOREIGN PATENT DOCUMENTS

| | | |
|---|---|---|
| EP | 0871173 | 10/1998 |
| WO | WO-97/01168 | 1/1997 |
| WO | WO-01/65559 | 9/2001 |

OTHER PUBLICATIONS

Acquaviva, Giovanni, "Declaration of Giovanni Acquaviva, Managing Director N2IT Holding B.V. (Jun. 14, 2007)", Testimony and Exhibits 1-15 in Support of Motion for Preliminary Injunction, *N2IT Holding B.V. v. Native Intruments North America, Inc.*, Jul. 16, 2007.

(Continued)

*Primary Examiner* — David S. Warren
(74) *Attorney, Agent, or Firm* — Jeffrey D. Myers; Peacock Myers, P.C.

(57) ABSTRACT

An apparatus for signal processing, wherein a disc is placed on a turntable and is provided with a groove which can be followed by the pick-up element, and employing a time-code signal wherein during use of the disc the said time-code signal controls the digital audio source.

20 Claims, 3 Drawing Sheets

(56) References Cited

U.S. PATENT DOCUMENTS

| | | | |
|---|---|---|---|
| 4,176,328 A | | 11/1979 | Brown et al. |
| 4,300,225 A | | 11/1981 | Lambl |
| 4,363,048 A | | 12/1982 | Tanaka et al. |
| 4,901,300 A | * | 2/1990 | Van Der Zande et al. ... 369/47.4 |
| 5,091,899 A | * | 2/1992 | Adachi et al. .................. 369/83 |
| 5,185,805 A | | 2/1993 | Chiang |
| 5,297,167 A | | 3/1994 | Buzbee et al. |
| 5,339,301 A | | 8/1994 | Raaymakers et al. |
| 5,345,244 A | | 9/1994 | Gildea et al. |
| 5,350,882 A | | 9/1994 | Koguchi et al. |
| 5,353,275 A | | 10/1994 | Almonte |
| 5,512,704 A | | 4/1996 | Adachi |
| 5,572,201 A | | 11/1996 | Graham et al. |
| 5,862,106 A | | 1/1999 | Washikawa et al. |
| 6,541,690 B1 | * | 4/2003 | Segers, Jr. ..................... 84/605 |
| 6,576,825 B2 | | 6/2003 | Yamada et al. |
| 6,618,329 B2 | * | 9/2003 | Liu ................................. 369/4 |
| 6,818,815 B2 | | 11/2004 | Cohen |
| 6,985,418 B2 | * | 1/2006 | Hori .......................... 369/47.38 |
| 7,012,184 B2 | | 3/2006 | Bastian |
| 7,041,892 B2 | | 5/2006 | Becker |
| 7,087,830 B2 | * | 8/2006 | Kent et al. ....................... 84/645 |
| 7,146,011 B2 | | 12/2006 | Yang et al. |
| 7,184,654 B2 | | 2/2007 | Kanamori et al. |
| 7,218,578 B2 | * | 5/2007 | Usui .......................... 369/30.27 |
| 7,235,732 B2 | * | 6/2007 | Becker ............................ 84/602 |
| 7,238,874 B2 | | 7/2007 | Bastian |
| 7,257,072 B2 | * | 8/2007 | Kikuchi .................... 369/53.43 |
| 7,489,598 B2 | * | 2/2009 | Hori ........................... 369/30.27 |
| 7,615,702 B2 | | 11/2009 | Becker et al. |
| 7,683,249 B2 | | 3/2010 | Becker |
| 7,933,084 B2 | * | 4/2011 | Howarth et al. ................ 360/25 |
| 7,964,782 B2 | * | 6/2011 | Liu ................................. 84/600 |
| 8,153,883 B2 | * | 4/2012 | Flum et al. ..................... 84/743 |
| 2003/0029305 A1 | * | 2/2003 | Kent et al. ....................... 84/645 |
| 2003/0043701 A1 | * | 3/2003 | Liu ........................... 369/30.23 |
| 2003/0185405 A1 | | 10/2003 | Spencer et al. |
| 2004/0004925 A1 | * | 1/2004 | Kikuchi .................... 369/53.43 |
| 2004/0017998 A1 | * | 1/2004 | Kobayashi et al. ............. 386/65 |
| 2004/0057344 A1 | * | 3/2004 | Baumann et al. ............... 369/18 |
| 2004/0190409 A1 | * | 9/2004 | Inoue et al. ................. 369/47.1 |
| 2005/0081699 A1 | | 4/2005 | Becker |
| 2005/0152236 A1 | | 7/2005 | Wardle |
| 2006/0165392 A1 | | 7/2006 | Kanamori et al. |
| 2007/0274181 A1 | * | 11/2007 | Yao .......................... 369/47.38 |
| 2008/0063214 A1 | | 3/2008 | Spencer et al. |
| 2008/0223197 A1 | * | 9/2008 | Becker ............................ 84/602 |
| 2009/0116660 A1 | | 5/2009 | Croft et al. |
| 2010/0020673 A1 | * | 1/2010 | Flum et al. .................... 369/264 |
| 2010/0027967 A1 | * | 2/2010 | Yamada ......................... 386/85 |
| 2010/0100208 A1 | * | 4/2010 | Onizuka et al. ................ 700/94 |
| 2010/0188351 A1 | * | 7/2010 | Lee et al. ...................... 345/173 |
| 2010/0192104 A1 | * | 7/2010 | Lee et al. ...................... 715/834 |
| 2010/0204811 A1 | * | 8/2010 | Transeau ........................ 700/94 |
| 2010/0230179 A1 | * | 9/2010 | Uchiyama et al. ......... 178/18.03 |
| 2011/0002479 A1 | * | 1/2011 | Camiel ........................... 381/81 |
| 2011/0094369 A1 | * | 4/2011 | Liu ................................. 84/645 |

OTHER PUBLICATIONS

Avenell, Simon, "eDucation: some of the economics of eCommerce and the future of Higher Education", Apple University Consortium e-Xplore 2001, Sep. 23, 2001, 1-1 to 1-11.

Bauer, Chris, "Remixing Reality—the role of new interfaces and the politics of techno-utopianism", MA Digital Arts Thesis, Middlesex University, 1998.

Bauer, Chris, "The Spacedeck Project", spacedeck project website, Nov. 16, 2001.

Blum, Stanton, "Stanton Finalscrtach 2", REMIX Magazine, May 1, 2005.

Boswell, Rod, "The Wedge Virtual Reality Theatre", Apple University Consortium e-Xplore 2001, Sep. 23, 2001, 2-1 to 2-6.

Crean, David, "QuickTime streaming: a gateway to multi-modal social analyses", Apple University Consortium e-Xplore 2001, Sep. 23, 2001.

Dodds, Alan, "High Tech, High Touch—Education at a Distance", Apple University Consortium e-Xplore 2001, Sep. 23, 2001.

Dunbar, Andrew et al., "JoePM: Implementing a Collaborative Environment for Learning Multimedia Project Management", Apple University Consortium e-Xplore 2001, Sep. 23, 2001, 5-1 to 5-8.

EPO Appeal, , "Applicant's Brief for Grounds for Appeal (Jan. 7, 2005)", Filed in EPO Serial No. 01908437.7 on Oct. 6, 2004., Jan. 7, 2005.

EPO Appeal, , "Applicant's Response to Technical Board of Appeal Preliminary Opinion", Proceeding regarding EPO Serial No. 01908437.5, Oct. 10, 2005.

EPO Appeal, , "EPO Appeal Board Copies of Oral Proceedings", EP 1 908437, Nov. 18, 2005.

EPO Appeal, , "EPO Appeal Board Decision", EP 1 908 437, Dec. 23, 2005.

EPO Appeal, , "EPO Communication Rule 51(6) EPC Allowance following Board Decision", EP 1 908 437, Jan. 25, 2006.

EPO Appeal, , "Opposition-Observations by Third Party (Dec. 3, 2003)—Applicant Response (Apr. 9, 2004)", EP 01 908 437.5, Dec. 23, 2005.

EPO Appeal, , "Request Reconsideration and Notice of Appeal of EPO Examiner's Refusal to Allow", EP 1-908 437, Aug. 5, 2004.

Final Scratch, , "What is Final Scratch", http://www.FINALSCRATCH.com/fs4/load.asp?db=FS_MAC&sub=start.

Finalscratch Club Network, , "Play Digital .. The Analog Way", FinalScratch Club Network web site, www.fianlscratch.com FS—MAC, Sep. 7, 2004.

Gardner, William G. et al., "Spectral Correlation of Modulated Signals: Part II-Digital Modulation", IEEE Transactions on Communications, vol.-COM-35, No. 6, Jun. 6, 1987, 595-601.

Hacker, Scott et al., "Finalscratch", "The BeOS Bible", published by Peachpit Press, Copyright 1999, 1999, 751.

Hogg, Suzanne, "Sound in Educational Presentations the Tantalising, Terrifying, Too-Often-Forgotte Tool", Apple University Consortium e-Xplore 2001, Sep. 23, 2001, 6-1 to 6-6.

Inque, T. et al., "A Disrete Four-Channel Disc and Its Reproducing System (CD-4 System)", Journal of Audio Engineering Society, Mar. 25, 1971, 162-169.

Jackson, Charles, "Declaration of Dr. Charles L. Jackson (Jun. 15, 2007)", Experts Testimony, USDC Central District of California, *N2IT Holding B.V. v. Native Intruments North America, Inc.*, Jul. 16, 2007.

Kemm, Robert E. et al., "Collaborative Learning: on-campus in a Technololgy Based Environment", Apple University Consortium e-Xplore 2001, Sep. 23, 2001, 7-1 to 7-14.

Kirn, Peter, "NI Ends Legal Dispute Over Traktor Scratch; Digital Vinyl's Twisty, Turny History", CreateDigitalMusic.com, Apr. 28, 2008.

Lai, Bing-Chang et al., "Developing a Java API for Digital Video Control Using the Firewire SDK", Apple University Consortium e-Xplore 2001, Sep. 23, 2001, 9-1 to 9-9.

Lai, Bing-Chang et al., "Programming the Velocity Engine", Apple University Consortium e-Xplore 2001, Sep. 23, 2001, 8-1 to 8-14.

Lowe, Richard, "Beyond "eye candy": Improving Learning with Animations", Apple University Consortium e-Xplore 2001, Sep. 23, 2001, 10-1 to 10-9.

Luca, Joe et al., "Designing and On-Line Learning Environment to Support the Development of Generic Skills: a case study", Apple University Consortium e-Xplore 2001, Sep. 23, 2001, 11-1 to 11-8.

Ludewig, Alexandra, "iMovie. A Student Project with Many Side-Effects", Apple University Consortium e-Xplore 2001, Sep. 23, 2001, 12-1-12-11.

M-AUDIO, , "Defendant's First Amended Answer", USDC-Virginia; 2:08-cv-00619, Oct. 9, 2009.

M-AUDIO, , "Defendant's Notice Under 35 USC 282", USDC-Virginia; 2:08-cv-00619, Nov. 13, 2009.

M-AUDIO, , "Defendant's Responses to First Set of Interrogatories", USDC-Virginia; 2:08-cv-00619, Jun. 29, 2009.

M-AUDIO, , "Defendant's Second Set of Supplemental Responses to First Set of Interrogatories", USDC Virginia 2:08-cv-00619, Aug. 13, 2009.

(56) References Cited

OTHER PUBLICATIONS

M-AUDIO, , "Defendant's Supplemental Responses to First Set of Interrogatories", USDC-Virginia; 2:08-cv-00619, Jul. 15, 2009.

M-AUDIO, ,"Defendant's Third Set of Supplemental Responses to First Set of Interrogatories", USDC-Virginia 2:08-cv-00619, Aug. 13, 2009.

M-AUDIO, , "Inital Expert Report of Thaddeus Fletcher", USDC-Virginia; 2:08-cv-00619, Sep. 24, 2009.

M-AUDIO, , "Plaintiff N2IT Holding's Objections and Responses to Defendant M-Audio's First Request for Admissions", USDC-Virginia; 2:08-cv-00619, Nov. 2, 2009.

M-AUDIO,—Russell J. , "Compact Disc Playback Unit with Advanced Variable Speed Control", Discovery Disclosure Unpublished Post Graduate Project Record of Structure, Implementation & Development; Computer Science Department, Univ. Auckland, New Zealand, Jan. 10, 1996,1-50.

McLoughlin, Catherine , "An E-Learning Solution to Creating Work-Related Skills and Comp;etencies for the Kowlede-based Community", Apple University Consortium e-Xplore 2001, Sep. 23, 2001, 14-1 to 14-13.

McLoughlin, Catherine , "Technological Tools for Visual Thinking: What Does the Research Tell Us?", Apple University Consortium e-Xplore 2001, Sep. 23, 2001,13-1 to 13-12.

McMahon, Mark , "Choreograph3D: Collaborative Innovation Through Dance and Multimedia", Apple University Consortium e-Xplore 2001, Sep. 23, 2001, 15-1 to 15-8.

Moore, Ross et al., "MacQTEX: Self-Testing Quizzes, Using PDF", Apple University Consortium e-Xplore 2001, Sep. 23, 2001, 16-1 to 16-14.

N2IT, , "Digital Audio DJ Mixing Software for BeOS", New Harmony Central News, Nov. 19, 1998.

OBrien, William , "Plaintiff N2IT Holding Notice of Motion and Motion for Preliminary Injunction (Jun. 20, 2007)", USDC Central California, *N2IT Holding B.V. v. Native Instruments North America, Inc.*, Jun. 20, 2007.

Pagram, Jeremy , "The Apple is Ripe, But the Connection Gives Us the PIP!", Apple University Consortium e-Xplore 2001, Sep. 23, 2001, 17-1 to 17-5.

Parkinson, Alan et al., "Decoupling the WebObjects Applications from the EOModel—a case study in OO Design", Apple University Consortium e-Xplore 2001, Sep. 23, 2001, 18-1 to 18-6.

Pearce, Jon , "Motion Workshop: Tracking Motion in an On-Line Environment", Apple University Consortium e-Xplore 2001, Sep. 23, 2001, 19-1 to 19-6.

Phillips, Rob et al., "The Use of QTVR for Teaching Radiology and Diagnostic Imaging", Apple University Consortium e-Xplore 2001, Sep. 23, 2001, 20-1 to 20-8.

Radcliff, John , "Time Code a User's Guide", Oxford-Focal Press, 3rd. Ed., Jun. 1999.

Rathinavelu, A. et al., "e-Learning for Hearing Impaired Students", Apple University Consortium e-Xplore 2001, Sep. 23, 2001, 21-1 to 21-6.

Rees, Philip , "Synchronisation and SMPTE timecode (time code)", www.philrees.co.uk/articles/timecode.htm, Oct. 29, 2003.

Rowland, Gregg et al., "Exploring On-Line Learning Communities: Supporting Physical and Health Education Professional Development Opportunities", Apple University Consortium e-Xplore 2001, Sep. 23, 2001, 22-1 to 22-7.

Ruberu, Dhammika , "Developing a Multimedia Engine in QuickTime for Java", Apple University Consortium e-Xplore 2001, Sep. 23, 2001, 23-1 to 23-9.

Segrave, Stephen , "QuickTime Multi-Track Theatricks", Apple University Consortium e-Xplore 2001, Sep. 23, 2001, 24-1 to 24-14.

Smythe, Neville , "e-Xplore 2001: a face-toface odyssey", Apple University Consortium Academic and Developers Conference, Sep. 23, 2001.

Voges, Kevin E. et al., "Computational Marketing Using an AppleSeed Cluster", Apple University Consortium e-Xplore 2001, Sep. 23, 2001, 25-1 to 25-11.

Chris Bauer, Remixing Reality—The Role of New Interfaces and the Politics of Techno-Utopianism, 1998, Ma Digitial Arts Thesis, Middlesex University, Cat Hill, Barnetm Herts EN4 8HT, United Kingdom.

\* cited by examiner

SYSTEM AND METHOD FOR CONTROLLING A DIGITAL AUDIO SOURCE

CROSS-REFERENCE TO RELATED APPLICATIONS

This application is a continuation application of U.S. patent application Ser. No. 12/507,242, entitled "Apparatus for Controlling a Digital Audio Source", filed on Jul. 22, 2009, which is a continuation application of U.S. patent application Ser. No. 11/773,195, entitled "Method For Signal Processing, And Apparatus Therefore", filed on Jul. 3, 2007, which is a continuation application of U.S. patent application Ser. No. 11/355,851, entitled "Disc For Use In An Apparatus For Signal Processing, And Such An Apparatus", filed on Feb. 15, 2006, which is now U.S. Pat. No. 7,238,874, issued Jul. 3, 2007, which is a divisional application of patent application Ser. No. 10/133,846, entitled "Disc For Use In An Apparatus For Signal Processing, And Such An Apparatus", filed on Apr. 26, 2002, which is now U.S. Pat. No. 7,012,184, issued Mar. 14, 2006, which is a Continuation of International Application Number PCT/NL01/00055 filed on Jan. 26, 2001 entitled "Disc For Use In An Apparatus For Signal Processing, And Such An Apparatus", which is a continuation and claims priority to The Netherlands application number NL 1014526, entitled "Disc For Use In An Apparatus For Signal Processing, And Such An Apparatus", filed Feb. 29, 2000. The specification and claims thereof are incorporated herein by reference.

STATEMENT REGARDING FEDERALLY SPONSORED RESEARCH OR DEVELOPMENT

Not Applicable

INTRODUCTION

The invention primarily relates to a disc for use in an apparatus for signal processing. Further, the invention relates to such an apparatus for signal processing.

BACKGROUND OF THE INVENTION

From WO 97/01168, a system is known for the digital processing of audio signals which is particularly suitable for disc jockeys and scratch artists. The speed and direction of a digital audio signal, for instance derived from a CD player, can be controlled according to this citation by the manual control of a rotational element. This rotational element is placed for instance on a turntable of a conventional record player and is being read by means of an optical sensor determining the speed and direction of rotation of the turntable. The data that are obtained thereby are being used to control the speed and direction of reproduction of the CD player. The problem associated with this known apparatus is, however, that it is hardly usable by disc jockeys and in scratch applications for the reason that from a given position of the reading head of the CD player only continuously developing relative movements are possible that depend on the control of the earlier mentioned rotational element. In the known apparatus, it is for instance not possible to make swift reproductions of different musical segments on the CD in a way that is reproducible and can be controlled satisfactorily. Also the authentic scratch sound which can be realized by means of a conventional record, cannot be obtained with the known apparatus.

SUMMARY OF THE INVENTION

With the invention it is intended to improve this and to provide a system which allows to provide a sound impression with a digital sound source which conforms to the possibilities that exist with conventional records, and with which quickly digitally recorded (musical) fragments can be located.

In a first aspect of the invention, a disc is proposed therefore which is designed for use in such an apparatus for signal processing, such that the disc during its use is placed on the turntable and is provided with a groove which can be followed by the pick-up element, and which comprises a time-code signal wherein during use of the disc the said time-code signal controls the digital audio source.

A practical embodiment of the disc is characterized in that the time-code signal is an absolute time-code signal that is comprised in the groove in a predetermined number subsequently arranged discrete steps. It is advisable to select the number of discrete steps in such way that the resolution is sufficiently high to realize the intended effect. In practice this means that the number of discrete steps may count five per second.

From a view point of cost efficiency and also to make a natural connection to the known scratching techniques with conventional records, it is desirable that the time-code signal is modulated on a carrier frequency in the audible range between 20 and 20,000 Hz. In this way, it is possible to simply use normal audio equipment for playing the disc.

In a further aspect of the invention, the apparatus for signal processing is so equipped that the pick-up element feeds a digital filter which has a phase-locked loop circuit for detecting and following a carrier frequency, and a demodulation circuit for demodulating the time-code signal that is modulated on the carrier frequency. The disc and the apparatus for signal processing can then cooperate such that the absolute time-code signal that is present on the disc, provides the control for the digital audio source.

It is further advantageous that the groove of the disc comprises a time-code signal in both the left and the right channel, which are mutually shifted in phase. In this way, a quick determination of the direction in respect of the rotation of the disc can be extracted.

Appropriately then the apparatus is equipped with a detection device for determining a phase difference between the time-code signal demodulated from the left and the right signal, respectively. In this way, the desired direction of play of the digital audio equipment can be determined already when the needle is lowered onto the disc according to the invention without noticeable delay, enhancing the impression that one is working with an entirely conventional analogue audio installation.

A suitable embodiment of the apparatus is characterized in that it comprises a digital audio buffer being under control of the time-code signal, and that the digital audio buffer is connected to a digital output filter which feeds a signal output which is selected from the group formed by a digital electric output socket, a digital optic signal output, and a D/A converter.

The scratch effect can be manufactured in such an apparatus particularly adequately when it comprises control logic being fed by the time-code signal for determining a velocity signal being a measure for the speed of change of the time-code signal, and that the digital output filter is being controlled by the said control logic.

BRIEF DESCRIPTION OF THE DRAWINGS

The invention will now be further elucidated in respect of a non-limiting embodiment explaining the disc and its use in an apparatus according to the invention in a schematic diagram.

DETAILED DESCRIPTION OF THE INVENTION

Figure 1:
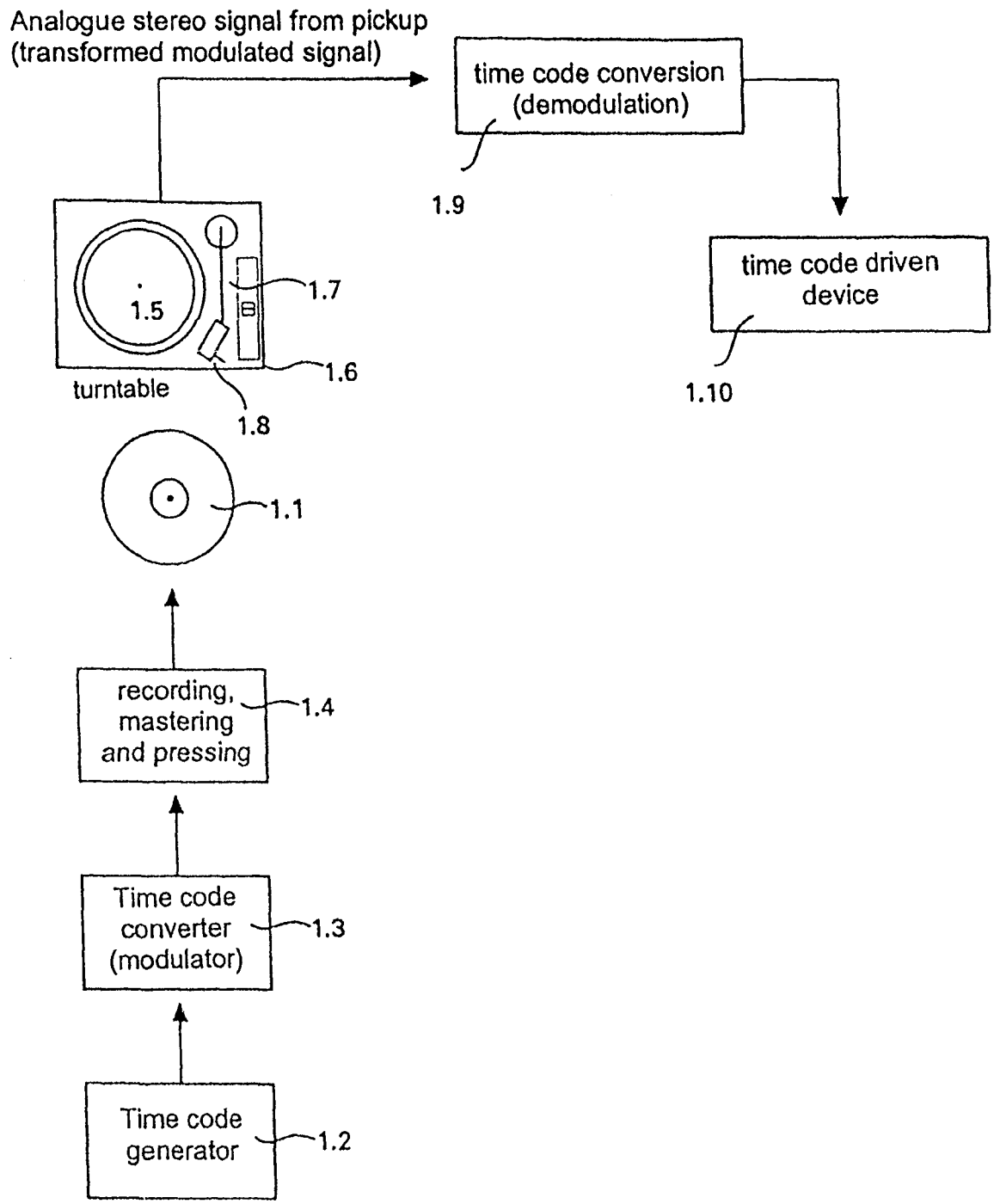
FIG. 1 shows schematically the apparatus for signal processing according to according to one embodiment of the present invention and the disc to be used thereby.

FIG. 1 shows a disc 1.1 which is manufactured according to known manufacturing techniques that have been in use for many years now in the manufacture of conventional records. The disc 1.1 is provided with an absolute time-code signal by making use of a time-code generator 1.2 controlling a modulator 1.3 which supplies a carrier frequency modulated by the time-code generator 1.2 and which is applied to the disc 1.1 as the only signal. Block 1.4 shows the conventional manufacturing method of recording, making of the master disc, and pressing the final vinyl disc 1.1. The disc 1.1 can be placed on a turntable 1.5 of a record player 1.6, which is further provided with an arm 1.7 and a pick-up element 1.8.

The pick-up element 1.8 can follow the groove in the disc 1.1 that comprises the absolute time-code signal, and the pick-up element 1.8 is connected to the apparatus part 1.9 for demodulating the carrier signal in order to provide the (digital) time-code signal, which serves for the control of the digital audio source 1.10, for instance a CD player, a DVD player, an MP3 reproduction device, or the like.

Figure 2:
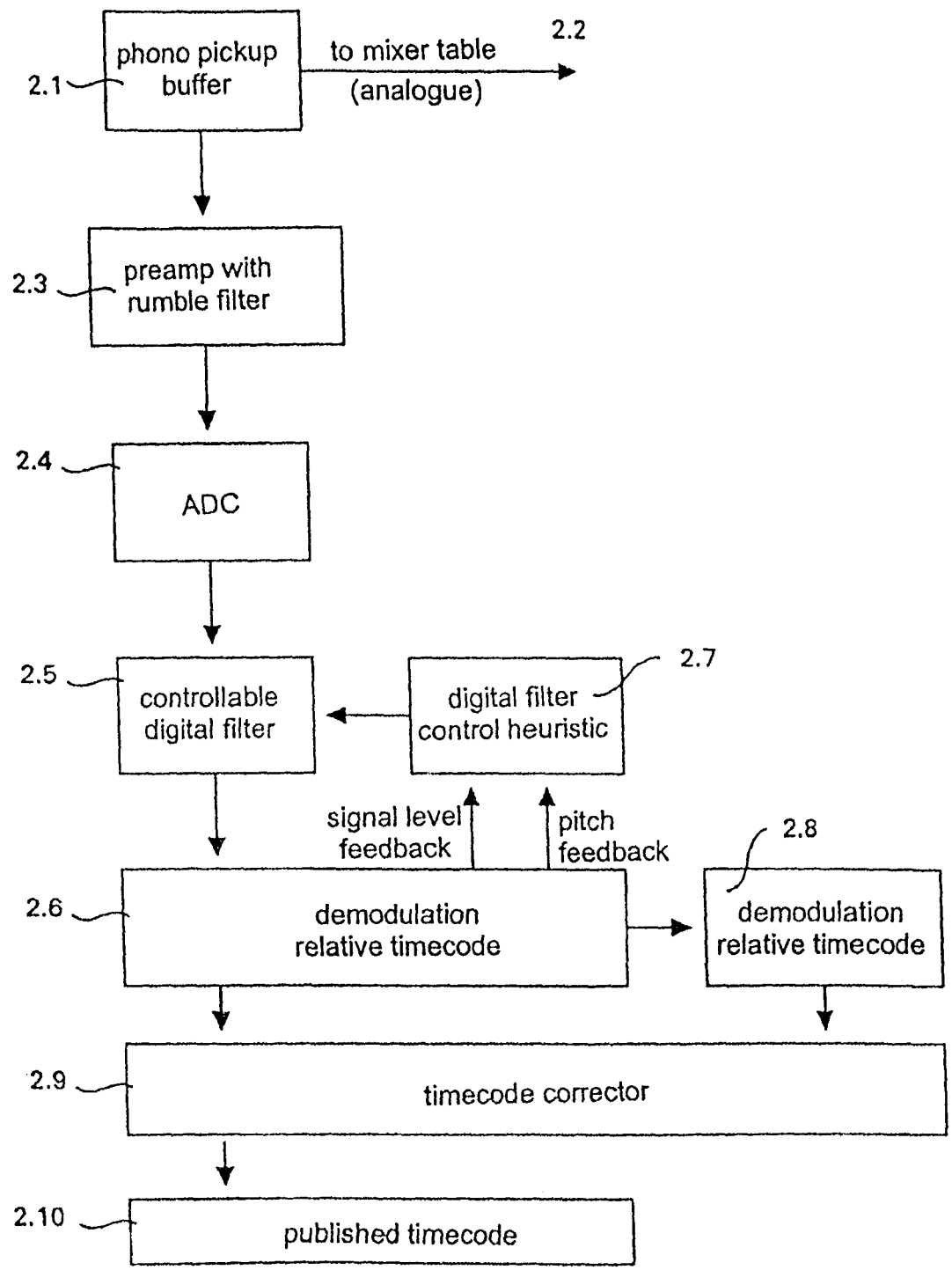
FIG. 2 show as block diagrams the signal processing applied in the apparatus according to one embodiment of the present invention.
Figure 3:
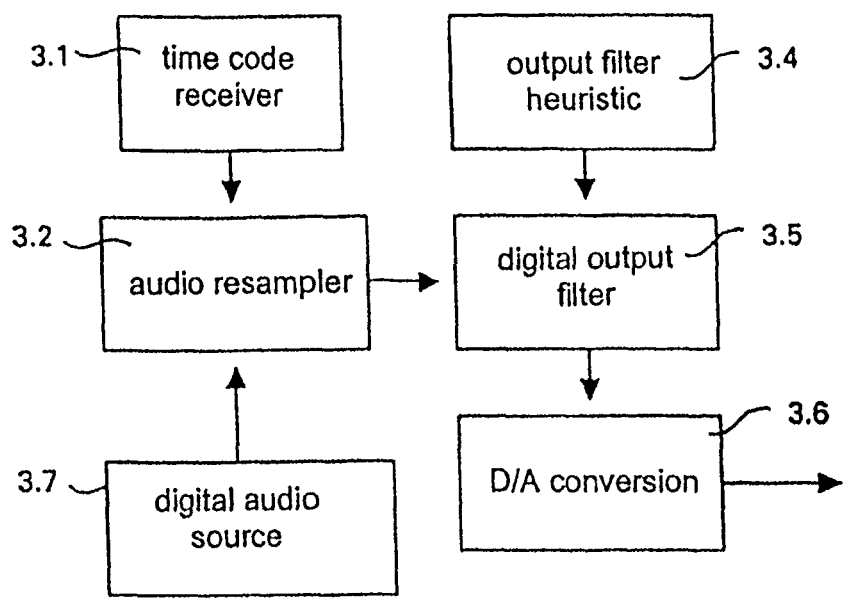
FIG. 3 then show as block diagrams the signal processing applied in the apparatus according to according to one embodiment of the present invention the invention.

The operation of the apparatus part 1.9 according to FIG. 1 will hereafter be further elucidated with reference to FIG. 2. The operation of the digital audio source 1.10 which stands under control of the time-code signal will hereafter be further elucidated with reference to FIG. 3.

Referring now first to FIG. 2, it is shown that the signal that is derived from the pick-up element 1.8 according to FIG. 1, is fed to a input buffer 2.1 from which a signal may be finally led to a mixing table 2.2 in order to provide for the situation that the turntable 1.5 according to FIG. 1 carries a conventional analogue vinyl record. The just-mentioned input buffer 2.1 feeds a preamplifier 2.3, provided with a low rejector circuit, and which feeds in turn an analogue/digital converter 2.4, for instance a 16-bit or 20-bit converter, depending on the desired resolution. The reference numerals 2.5, 2.6 and 2.7 refer to a digital filter, the operation of which depends on, inter alia, the speed of movement of the disc 1.1 according to FIG. 1 vis-a-vis the pick-up element 1.8. The apparatus part 2.7 of FIG. 2 may comprise a phase-locked loop circuit for detecting and following the carrier frequency which is provided on the disc 1.1 according to FIG. 1. In the current implementation, however, use is made of a moving average filter supplemented with detection means for detecting a stand-still of the disc 1.1. Furthermore, demodulation takes place in the circuit of apparatus part 2.6 for demodulating the time-code signal that is modulated on the carrier frequency. Although the above subject matter is shown and explained as the signal in a single channel, it is preferable according to the invention that a left and a right channel is present, and that the detection apparatus which forms part of the digital filter 2.5, 2.6, 2.7 is made in duplicate so as to allow a phase difference between the left and the right channel carrying the demodulated time-code signal to be determined. In this manner, the correct place and direction of movement of the disc 1.1 in relation to the pick-up element 1.8 according to FIG. 1 can be determined with high resolution.

The phase difference between the left and right channel is useful to extract the directional information very quickly when the pick-up element 1.8 is suddenly lowered onto the rotating disc 1.1. The absolute time-code which is determined from the carrier frequency is subsequently used together with the relative time-code, which is based on the difference between the left and the right channel, to determine an accurate time-code signal 2.10 which serves to control the digital audio source 1.10 as shown in FIG. 1. The time-code signal 2.10 of FIG. 2 is therefore read into apparatus part 3.1 (see FIG. 3) of the digital audio source, wherein same provides a direct control of a digital audio reader 3.2 reading the desired digital information from the correct place of for instance a CD disc. This digital audio information is being transferred from apparatus part 3.2 to a digital output filter 3.5 which is being controlled by control logic 3.4, and which determines from the time-code signal which is read into apparatus part 3.1, the speed of change of the time-code signal. This speed of change signal which is derived from the time-code signal, determines the parameters of the digital output filter 3.5. In a manner known to the expert, the digital output filter 3.5 can then feed a digital electric output socket, a digital optical signal output, or a D/A converter. This last provision is shown in the Figure with reference numeral 3.6.

The present invention has been described in terms of preferred embodiments, however, it will be appreciated that various modifications and improvements may be made to the described embodiments without departing from the scope of the invention.

What is claimed is:

1. A method for controlling the play of sound from an audio source, the method comprising:
   reading, from a disc rotating on a player, an absolute control signal indicative of speed of disc play and directionality of disc play;
   determining a relative control signal based on a phase difference between a left channel and a right channel of the absolute control signal; and
   processing the absolute control signal and the relative control signal to determine an accurate time-code signal serving to control sound play of an audio source at a speed and direction corresponding to that of the disc play,
   wherein processing the absolute control signal and the relative control signal includes subjecting at least one of the absolute and relative control signals to time-code correction.

2. The method for controlling the play of sound according to claim 1, wherein the absolute control signal comprises information sufficient to determine speed and directionality of disc play.

3. The method for controlling the play of sound according to claim 1, wherein the absolute control signal includes a control signal with a time-code indicative of position of play on the disc.

4. The method for controlling the play of sound according to claim 3, wherein the absolute control signal comprises a right and a left channel carrying signals shifted in phase, wherein the relative control signal is determined based on the phase difference between the right and left channels.

5. The method for controlling the play of sound according to claim 1, wherein the relative time-code signal is indicative of directionality of disc movement.

6. A system for controlling play of sound from an audio source, the system comprising:
- a disc including a control signal indicative of speed of disc play, directionality of disc play and place on the disc of play;
- a first digital filter which processes the control signal to determine a relative control signal based on a phase difference between a left channel and a right channel of the control signal; and
- a second digital filter which processes the control signal and the relative control signal to determine an accurate time-code signal serving to control, without noticeable delay, sound play from an audio source at a speed, direction, and position corresponding to that of the disc play,
- wherein processing the control signal and the relative control signal includes subjecting one or more of the control signal and the relative control signal to time-code correction.

7. The system for controlling the play of sound according to claim 6, wherein the control signal is in the audible range of 20 to 20,000 Hz.

8. The system for controlling the play of sound according to claim 6, wherein the control signal comprises information sufficient to determine speed and directionality of disc play.

9. The system for controlling the play of sound according to claim 6, wherein the control signal includes an absolute time-code signal indicative of position of play on the disc.

10. An apparatus for controlling an audio source, comprising:
- a player;
- a disc comprising an absolute time-code signal in the audible range, wherein the disc rotates on the player;
- a pick-up element deriving the absolute time-code signal from the disc;
- a time-code corrector correcting the derived time-code signal; and
- a time-code receiver receiving the corrected time-code signal to be used to control an audio source,
- wherein the absolute time-code signal comprises a right channel and a left channel, and
- wherein a relative time-code signal is determined by detecting a phase difference between the right channel and the left channel.

11. The apparatus according to claim 10, wherein the audio source comprises one or more of a CD player, a DVD player, and an MP3 device.

12. The apparatus according to claim 11, wherein control of the audio source includes controlling the play of sound from the audio source.

13. The apparatus according to claim 10, wherein the speed and the direction of play of the audio source is controlled by the corrected time-code signal.

14. The apparatus according to claim 10, wherein the direction of the play of the audio source is controlled by the relative time-code signal.

15. The apparatus according to claim 10, wherein the time-code signal includes a control signal indicative of position of play on the disc and wherein the position of play of the audio source is controlled by the corrected time-code signal.

16. A method for controlling the play of sound from an audio source, the method comprising:
- reading, from a disc rotating on a player, an absolute control signal indicative of speed of disc play and directionality of disc play;
- determining a relative control signal based on a phase difference between a left channel and a right channel of the absolute control signal;
- processing the absolute control signal and the relative control signal to determine an accurate time-code signal; and
- utilizing the accurate time-code signal to control sound play of an audio source at a speed and direction corresponding to that of the disc play.

17. A method for controlling an audio source, comprising:
- processing a disc rotationally on a player, wherein the disc comprises a control signal in the audible range between 20 and 20,000 Hz;
- deriving the control signal from the disc with a pick-up element;
- determining a relative control signal based on a phase shift between a right channel and a left channel of the control signal;
- processing the control signal and the relative control signal to determine an accurate control signal; and
- reading the accurate control signal into a receiver to provide control of an audio source.

18. The method according to claim 17, wherein control of the audio source includes controlling the speed and the direction of play of the audio source.

19. The method according to claim 17, wherein control of the audio source includes controlling the play of sound from the audio source.

20. The method according to claim 17, wherein the audio source comprises one or more of a CD player, a DVD player, and an MP3 device.

* * * * *